(12) United States Patent
Tang

(10) Patent No.: US 7,440,180 B2
(45) Date of Patent: Oct. 21, 2008

(54) INTEGRATION OF RARE-EARTH DOPED AMPLIFIERS INTO SEMICONDUCTOR STRUCTURES AND USES OF SAME

(76) Inventor: Yin S. Tang, 201 Rockview, Irvine, CA (US) 92612

( * ) Notice: Subject to any disclaimer, the term of this patent is extended or adjusted under 35 U.S.C. 154(b) by 420 days.

(21) Appl. No.: 10/778,737

(22) Filed: Feb. 13, 2004

(65) Prior Publication Data

US 2005/0195472 A1    Sep. 8, 2005

(51) Int. Cl.
*H01S 5/00* (2006.01)
*H04B 10/12* (2006.01)

(52) U.S. Cl. .................. 359/344; 359/347
(58) Field of Classification Search .................. 359/333, 359/344, 347
See application file for complete search history.

(56) References Cited

U.S. PATENT DOCUMENTS

| | | | |
|---|---|---|---|
| 4,394,623 A | 7/1983 | Kurnit | 359/334 |
| 4,523,315 A | 6/1985 | Stone | 372/3 |
| 4,575,645 A | 3/1986 | Komine | 359/327 |
| 4,737,960 A * | 4/1988 | Tsang | 372/45.01 |
| 4,913,507 A | 4/1990 | Stamnitz et al. | 385/122 |
| 5,107,538 A | 4/1992 | Benton et al. | |
| 5,322,813 A * | 6/1994 | Beach | 117/88 |
| 5,463,649 A | 10/1995 | Ashby et al. | |
| 5,646,425 A * | 7/1997 | Beach | 257/102 |
| 5,796,906 A | 8/1998 | Narayanan et al. | 385/129 |
| 6,178,036 B1 | 1/2001 | Yao | 359/334 |
| 6,277,664 B1 * | 8/2001 | Lozykowski et al. | 438/22 |
| 6,292,288 B1 | 9/2001 | Akasaka et al. | 359/334 |
| 6,483,861 B2 * | 11/2002 | Moon | 372/45.01 |
| 6,519,082 B2 | 2/2003 | Ghera et al. | 359/341.4 |
| 6,556,339 B2 | 4/2003 | Smith et al. | 359/334 |
| 6,587,606 B1 | 7/2003 | Evans | 385/15 |
| 6,600,597 B2 | 7/2003 | Beeson | 359/342 |

(Continued)

FOREIGN PATENT DOCUMENTS

JP    05283743 A    * 10/1993

OTHER PUBLICATIONS

Islam, Mohammed. Raman Amplifiers for Telecommunications. IEEE Journal of Selected Topics in Quantum Mechanics, vol. 8, No. 3, May/Jun. 2002.*

(Continued)

*Primary Examiner*—Eric Bolda

(57) ABSTRACT

An integrated device is disclosed which has a substrate and a Rare-Earth Doped Semiconductor layer (REDS layer) integrated with the substrate. The REDS layer is patterned to define one or more optically amplifying structures each having a first I/O port for receiving or outputting a first optical signal, and at least one pump energy receiving port for receiving pumping energy in the form of at least one of electrical pump energy and/or optical pump energy. In one particular set of embodiments, at least one of the optical amplifying structures is a Raman type amplifier where a corresponding pump energy receiving port is structured for receiving Raman type pumping energy having an effective frequency which is about one optical phonon frequency higher than a signal frequency of an optical signal supplied at a corresponding I/O port. Methods are disclosed for fabricating Rare-Earth Doped Semiconductor layers, including providing such layers in semiconductor-on-insulator (SOI) structures and for enhancing the effective, long-term concentrations of incorporated, rare earth atoms. Additionally, non-parallel pumping techniques are disclosed.

38 Claims, 6 Drawing Sheets

U.S. PATENT DOCUMENTS

| | | | |
|---|---|---|---|
| 6,603,595 B2 | 8/2003 | Welch et al. ................ | 359/334 |
| 6,603,785 B2 | 8/2003 | Yoshida et al. ............... | 372/45 |
| 6,611,369 B2 | 8/2003 | Matsushita et al. .......... | 359/334 |
| 6,618,192 B2 | 9/2003 | Islam et al. ................. | 359/334 |
| 6,624,927 B1 | 9/2003 | Wong et al. ................. | 359/334 |
| 6,624,928 B1 | 9/2003 | Masum-Thomas et al. .................... | 359/341.31 |
| 6,631,028 B1 | 10/2003 | Islam ......................... | 359/349 |
| 6,643,308 B2 | 11/2003 | Tsukiji et al. ................ | 372/46 |
| 6,646,788 B2 | 11/2003 | Islam et al. ................. | 359/334 |
| 6,650,816 B2* | 11/2003 | Bazylenko et al. .......... | 385/129 |
| 6,657,777 B1 | 12/2003 | Meli et al. .................. | 359/334 |
| 6,657,778 B1 | 12/2003 | Motoshima et al. ...... | 359/337.1 |
| 6,661,567 B2* | 12/2003 | Clapp ......................... | 359/333 |
| 6,721,087 B2* | 4/2004 | Alduino et al. ............ | 359/333 |
| 6,778,319 B2* | 8/2004 | Chavez-Pirson et al. .... | 359/333 |
| 6,807,002 B2* | 10/2004 | Yoon ......................... | 359/346 |
| 6,807,204 B1* | 10/2004 | O'Dowd ..................... | 372/32 |
| 2002/0048289 A1* | 4/2002 | Atanackovic et al. ......... | 372/20 |
| 2002/0089711 A1* | 7/2002 | Conzone et al. ............. | 359/109 |
| 2002/0104822 A1 | 8/2002 | Naydenkov et al. .......... | 216/24 |
| 2002/0172464 A1 | 11/2002 | Delwala ...................... | 385/40 |
| 2003/0021568 A1 | 1/2003 | Samara-Rubio et al. ..... | 385/132 |
| 2003/0067676 A1* | 4/2003 | Wang et al. ................. | 359/344 |
| 2003/0072882 A1 | 4/2003 | Niinisto et al. | |
| 2003/0086672 A1* | 5/2003 | Takayama et al. ........... | 385/129 |
| 2003/0178629 A1 | 9/2003 | Yagi | |
| 2003/0210725 A1 | 11/2003 | Prassas et al. ................ | 372/50 |
| 2003/0223673 A1 | 12/2003 | Garito et al. | |
| 2003/0234978 A1 | 12/2003 | Garito et al. | |
| 2004/0028336 A1* | 2/2004 | Feuer et al. .................... | 385/50 |
| 2004/0081415 A1* | 4/2004 | Demaray et al. ............. | 385/129 |
| 2004/0149353 A1* | 8/2004 | Hill ............................... | 148/33 |
| 2004/0222411 A1* | 11/2004 | Atanackovic et al. ......... | 257/34 |

OTHER PUBLICATIONS

Weik, Martin. Fiber Optics Standard Dictionary. 3rd Edition. Chapman & Hall. 1997. p. 901.*

Burke et al. Design of Ridge Waveguide Couplers with Carrier Injection using Discrete Spectral Index Method. Electronics Letters. Apr. 23, 1992. vol. 28, No. 9.*

Bol et al. On the Incorporation of Trivalent Rare Earth Ions in II-VI Semiconductor Nanocrystals.. Chem. Matter. 2002. 14. 1121-1126.*

Kim, Seong-Ku, et al., "Electrooptic Polymer Modulators With an Inverted-Rib Waveguide Structure," IEEE Photonics Technology Letters, vol. 15, No. 2, Feb. 2003, pp. 218-220.

Tang, Y.S., et al., "Development and Prospective of SOI Based Photonic Components for Optical CDMA Application," Proc. SPIE, vol. 3953, Jan. 28, 2000, pp. 2-10.

Tang, Y.S., et al., "Advances in Developing SOI Based Optical CDMA Chips," Proc. SPIE, vol. 4293, 2001, pp. 10-14.

International Search Report, PCT/US05/04703, mailing date Aug. 22, 2006.

* cited by examiner

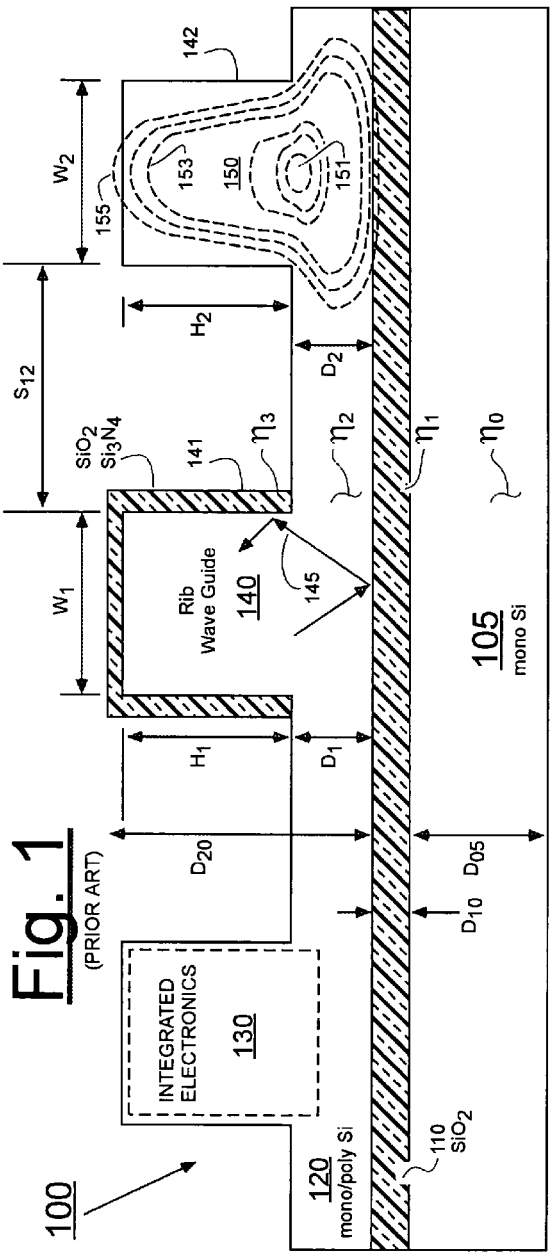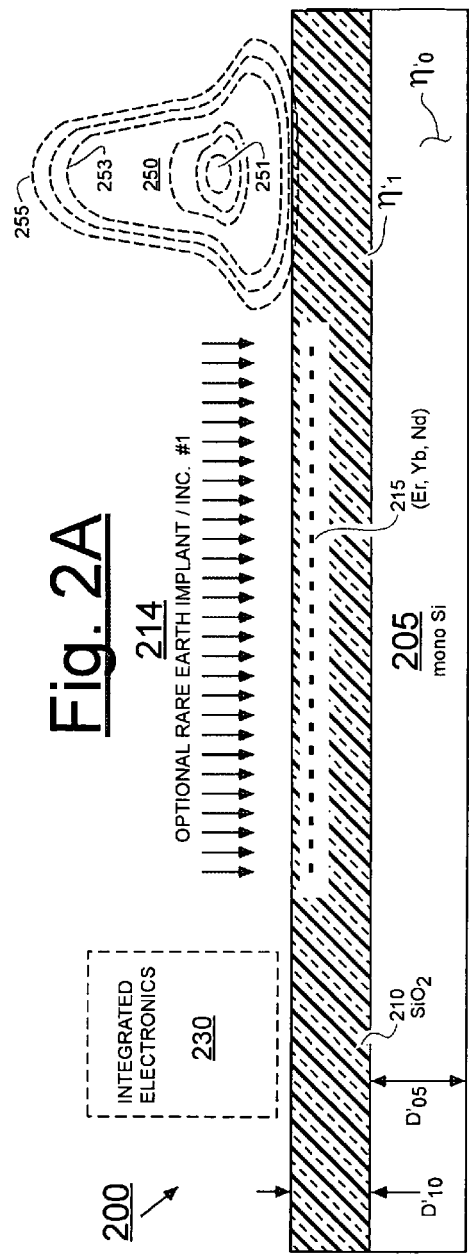

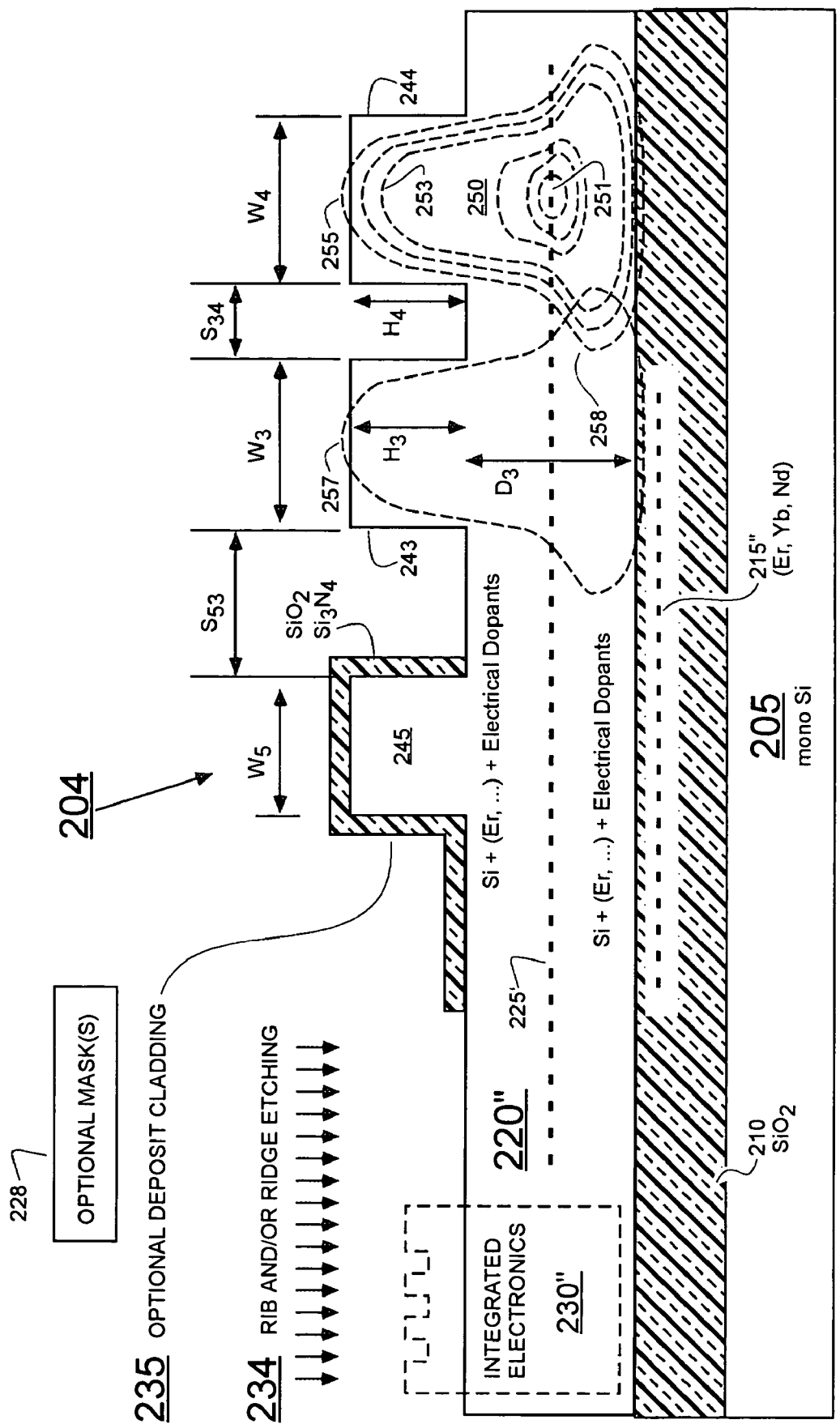

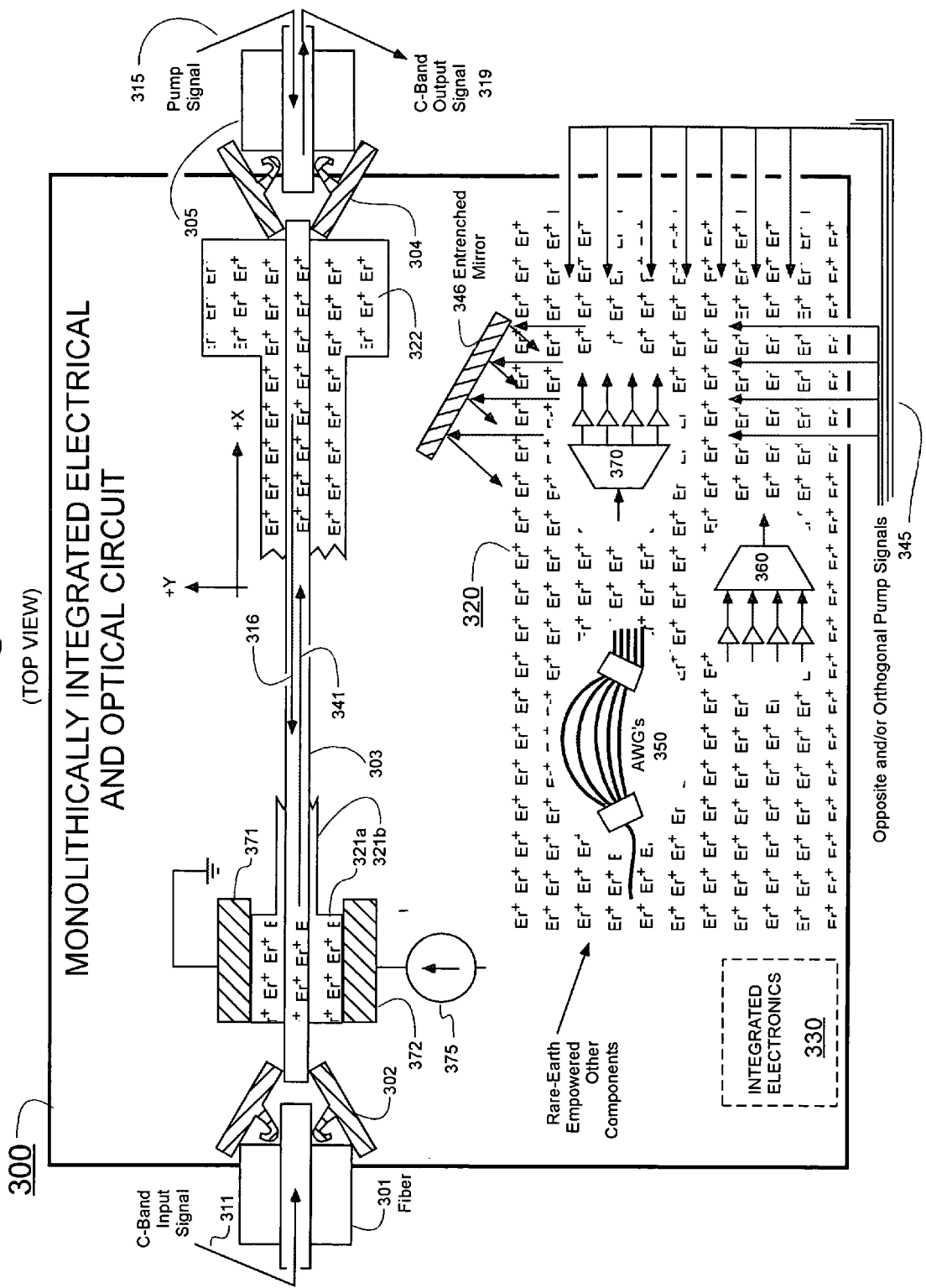

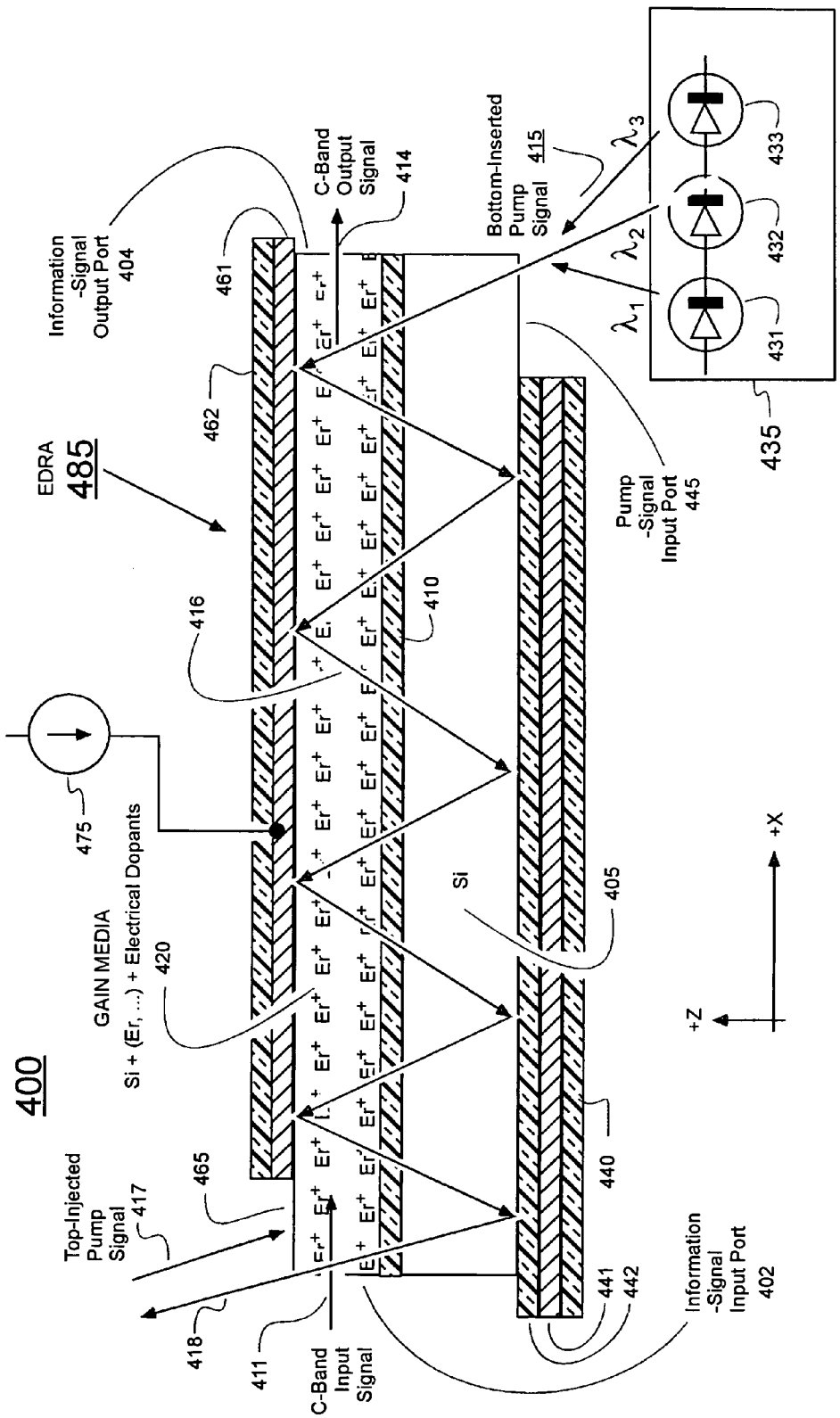
Fig. 4 (SIDE VIEW)
MONOLITHICALLY INTEGRATED OPTICAL CIRCUIT 400

INTEGRATION OF RARE-EARTH DOPED AMPLIFIERS INTO SEMICONDUCTOR STRUCTURES AND USES OF SAME

FIELD OF DISCLOSURE

The present disclosure of invention relates generally to solid state amplification of optical signals in photonic structures such as in monolithically integrated structures.

The disclosure relates more specifically to the provision of rare-earth doped gain regions into photonic and/or electro-optical structures and to uses of the same.

CROSS REFERENCE TO PATENTS

The disclosures of the following U.S. patents are incorporated herein by reference:
(A) U.S. Pat. No. 6,292,288, Akasaka et al, Sep. 18, 2001 {Short abstract: Semiconductor lasers are multiplexed together to pump Er-doped fiber for flattened power output};
(B) . . . In order to avoid front end clutter, this cross referencing section (2) continues as (2') at the end of the disclosure, slightly prior to recitation of the patent claims. Additional, non-patent material is also cited there.

DESCRIPTION OF RELATED ART

Discrete optical fibers are typically used as the primary building blocks of modern optical networks. The fibers are often formed to have a cylindrical core section and one or more, cylindrical-shell shaped cladding sections around the core, all made of flexible materials. The core and claddings are provided with different refractive indices so as to encourage optical signals to propagate along the fibers, usually by total internal reflection.

In theory, optical signals should travel very long distances over fibers. However, real-world fibers exhibit loss and dispersion. As a result, optical signals traveling through real-world fibers lose optical signal strength and/or waveform integrity. The signals often need to be periodically amplified and the signal content (e.g., waveform) of such signals frequently needs to be re-shaped or regenerated; typically by using so-called O-E-O modules. Generally, an O-E-O module operates by first converting a weakened and/or distorted optical signal into electrical form, and then by reconditioning the transduced signal (O-E conversion) and then by regenerating the signal back into optical form by, for example, using an electrically-modulated laser (E-O conversion) to thereby produce the revitalized signal. Such an O-E-O process typically occurs every 50 kilometers or so along conventional fiber links.

In addition to O-E-O reprocessing, simple optical amplification (without conversion and waveform reconditioning) may also occur along conventional fiber links, typically at shorter interims of the transmission. One of the key components for providing such optical-only amplification is so-called Erbium Doped Fiber Amplifiers (EDFA's). These are widely used in the fiber optical telecommunications industry including both for long haul and metro networks. As their name implies, EDFA's conventionally include a discrete optical fiber whose core is doped with erbium (Er). The Er doping causes the doped fiber section to operate as a gain medium. When such a gain medium is pumped with external pump energy, such as from a laser of appropriate wavelength, optical signals of appropriate wavelength in the fiber can be amplified.

Aside from EDFA's, so-called Semiconductor Optical Amplifiers (SOA's) are also commonly used in the industry, especially for metro networks where the fiber layout is usually not more than a couple of hundred miles. It is understood by those skilled in the art that quantum noise level of SOA-processed optical signals is very high compared to that generated by EDFA's. This fundamentally limits the applicable situations in which SOA's may be deployed.

In a conventional EDFA, energy is added to the incoming optical signal from an appropriately coupled pump laser. The pump laser is usually in the form of a solid state laser operating at a wavelength of around 980 nm. Recently, the industry has begun adopting a new kind of EDFA,—a so-called, Raman pumped EDFA which is also referred to as an Erbium doped Raman Amplifier or "EDRA". EDRA's tend to exhibit much better performance than standard EDFA's, and it is believed they could extend the optical-only transmission distance of information to hundreds of miles of fiber or more without need for signal regeneration. Unlike standard EDFA's, these Raman amplifiers (EDRA's) use a pump laser having a laser frequency which is about one optical phonon frequency higher than the signal frequency. In other words, for the standard C-band centered at about 1.5 µm wavelength that is used in long haul fiber optical networks, the required pumping laser is about 100 nm shorter in wavelength than the information carrying wavelength (or, ~1.4 µm in this case). It is believed that phonon interaction and nonlinear media behavior produce the observed gain in signal strength.

Although the performance of the newer Raman amplifiers (EDRA's) is very good, the cost of a discrete EDRA amplifier module tends to be very high; much higher than the already costly, discrete EDFA modules. Additionally, both of conventional EDRA's and EDFA's suffer the drawbacks of having very large physical sizes and high power consumptions.

The gain media for both of conventional EDRA's and EDFA's is typically, a discrete optical fiber that is doped with erbium (Er)—when used for 1.5 µm C-band information transmitting applications. The pump source can be defined by multiple semiconductor lasers of differing wavelengths that are multiplexed together to cover the broad band range which may be required by the telecommunications network. Various modifications may be provided for obtaining flattened power output over the whole range of wavelengths in the used frequency band. These may include adjusting individual pump lasers at different wavelengths and/or deploying gain flattened wavelength filters (gain equalizers).

Recently, erbium-doped polymer materials (organic compounds) have been studied and optical amplifiers based on such erbium doped polymers have been proposed. The proposals include those that suggest the fabrication of planar waveguides where the planar waveguides are fabricated with the erbium doped polymers so as to provide devices that are small and cheap and easy to mass produce and can be monolithically integrated with other planar optical elements (e.g., planar waveguides) so as to perform different functions—the so-called photonic integrated chip. These proposals have drawbacks. Polymer based materials tend to be unstable and unreliable due to their organic material nature (e.g., they tend to have large and disorderly molecule chains with embedded holes that can trap gases and/or release or absorb gases from the environment, this making the polymer-based amplifiers very sensitive to environmental changes such as changes in temperature and/or humidity).

Because of these drawbacks, the industry still lacks a practical way for providing integrated optical signal amplification without incurring the high cost, large module size, and the high power consumption typically associated with discrete versions of EDRA's and EDFA's.

INTRODUCTORY SUMMARY

Structures and methods may be provided in accordance with the present disclosure of invention for improving over the above-summarized shortcomings of the art.

More specifically, in accordance with one aspect of the present disclosure, there is provided a monolithically integrated device comprising: (a) a substrate; and (b) a substantially non-organic, Rare-Earth Doped Semiconductor layer (REDS layer) integrated with the substrate, where the REDS layer is patterned to define one or more optical amplifying structures each having: (b.1) at least a first I/O port for receiving or outputting a first optical signal, and (b.2) at least one pump energy receiving port for receiving pumping energy in the form of at least one of electrical pump energy and/or optical pump energy. In one particular set of embodiments, at least one of the optical amplifying structures is a Raman type amplifier where a corresponding pump energy receiving port (b.2a) is structured for receiving Raman type pumping energy having an effective frequency which is about one optical phonon frequency higher than a signal frequency of an optical signal supplied at a corresponding I/O port.

In accordance with a further aspect of the present disclosure the REDS layer (Rare-Earth Doped Semiconductor layer) is patterned to further define one or more optical processing elements such as plural waveguides (WG's—or more specifically, Arrayed WaveGuides (AWG's) which can respectively process different wavelengths, thus providing wavelength domain multiplexing and demultiplexing), gratings, phase shift modulators, and optically, electrically and/or mechanically (e.g., MEM's) controlled spatial multiplexers and/or demultiplexers. With the use of semiconductor-based gain media (e.g., monocrystalline silicon that is appropriately doped with one or more rare earth elements) instead of organic-based gain media it becomes possible to provide stable and reliable optical amplification integrally with further optical processing functions such as AWG's, etc. Thus, an integrated, solid-state, planar optical device with good reliability and stability may be provided that can be used with electrical pump energy and/or optical pump energy—where the latter can be a Raman pump or a non-Raman pump. If a Raman pump is used, the device may be structured to reshape (recondition) the optical information contained in the amplified beams, as generally would an O-E-O module that contains electrical amplification means, electrical signal reconditioning and optical signal regeneration means.

In accordance with further aspects of the present disclosure it will be seen that non-organic materials such as silicon and/or silicon oxide and/or other semiconductors and/or their compounds can be integrally formed as part of a monolithic or other integrated device so as to define an optical gain media that is erbium doped (Er-doped) for use, for example in the 1.5 μm transmission band; and/or that is doped with other rare earth elements such as Nd+ or Yb+ doped for respective use in the 1.34 μm or 1.3 μm bands. Preparation methods for forming the rare earth doped semiconductor regions may include surface plasma deposition of the rare earth elements, and/or inclusion of the rare earth elements in vapor deposition processes (e.g., CVD, ALD, etc.) and/or diffusion, and/or ion implantation of the rare earth elements into the material regions that are to function as optical gain regions. Additionally, concentrations of the incorporated rare earth elements (e.g., Er) in their host materials (e.g., Si or $SiO_2$) may be enhanced by use of respectively more-soluble rare earth compounds (e.g., ErO) that can form solubility-enhancing complexes (e.g., Er—O—Si=Si= . . . ) with their host materials. Additionally or alternatively, concentrations of the incorporated rare earth elements (e.g., Er) in their host materials (e.g., monocrystalline or polycrystalline Si or $SiO_2$) may be enhanced by trapping them under or between amorphous layers (e.g., amorphous Si and/or amorphous silicon oxide or amorphous silicon nitride) so as to reduce out-diffusion, particularly as a result of rare earth dopant (e.g. Er) activation by rapid thermal annealing or the like.

In accordance with further aspects of the present disclosure it will be seen that the optical gain regions may be integrated within ridge waveguides, rib waveguides and/or the like and that the latter may define amplifying waveguides, amplifying arrayed waveguides (AWG's), amplifying optical switches and other optical or electro-optical components of suitable small sizes that may be used for photonic integration applications. It will be seen that various optical gain-media pumping methods may be employed including electrical current injection (for generating electrically excited luminescence or electroluminescence); use of 980 nm laser pump and/or use of Raman pumping. It will be seen that various pump energy injection configurations may be used including: non-parallel injection (this including having the pumping beam travel in any direction other than parallel to, and in exactly the same direction as that of the signal beam) and more specifically, having the pumping beam travel generally perpendicularly to the information-carrying, signal beam and repeatedly bouncing the pumping beam back and forth in non-parallel fashion within the gain media so as to increase the number of signal-amplifying interactions occurring between the triad of the pumping beam, the signal beam, and the available concentration of rare earth atoms. More specifically, metallic or other mirrors may be used to provide multiple internal reflection of the pump energy through the gain media to thereby increase pumping efficiency and reduce pump-to-signal interference and to thereby produce an easily-extractable output signal beam that has improved signal to noise ratio).

In accordance with further aspects of the present disclosure it will be seen that the integrally formed, optical-gain regions may be used to fabricate active rather than passive multiplexer/demultiplexer (MUX/DEMUX) components so that such normally-lossy components can become substantially lossless or even provide greater than-unity gain. Such improved MUX/DEMUX with gain components may be suitably used for creating Metro optical networks without the need for other types of larger and more expensive amplifiers (e.g., discrete EDFAs, SOAs, etc.). Devices formed in accordance with the disclosure can be used for single wavelength operations or multi-channel, wavelength-division operations, with or without integrated MUX/DEMUX functionalities.

It will be seen that the integrally formed, optical-gain regions may be used to monolithically form Erbium Doped Planar Amplifiers (EDPA's) or Erbium Doped Planar Raman Amplifier (EDPRA's) for use with on-the-fly optical signal regeneration (that is, without the need for O-E-O conversion), as well as for use in eliminating passive waveguide loss in integrated photonic components and modules. Devices built in accordance with the disclosure may be made compact in size, cheap to mass produce and with the reliability and consistency advantages associated with electronic integrated circuits made of similar semiconductor materials (e.g., Si that is doped only with electrical conductivity providing dopants, $SiO_2$ and the like). It will be seen that devices built in accordance with the disclosure may be made suitable for on-chip integration of photonic, electronic, and/or electro-photonic functionalities so as to increase overall usefulness without substantial sacrifice of device performance.

A method in accordance with the present disclosure for mass producing integrated photonic and/or electro-photonic devices may include the steps of: (a) incorporating one or more rare earth elements with appropriate concentrations into silicon and/or silicon oxide and/or into other semiconductors and/or their dielectric compounds, where the incorporation may occur as the semiconductor and/or semiconductor compound regions are being grown or otherwise formed directly on a monolithically integrated device or as they are formed for subsequent bonding to the monolithically integrated device and where the incorporation correspondingly defines one or more optical gain media regions within the integrated device; (b) defining respective signal input ports in the integrated device for receiving input optical signals into corresponding ones of the one or more optical gain media regions; (c) defining respective pump energy receiving means in the integrated device for receiving pump energy into corresponding ones of the one or more optical gain media regions; and (d) defining respective signal output means in the integrated device for outputting optical signals from corresponding ones of the one or more optical gain media regions. The fabrication process may further include the formation of appropriate pump energy guiding means for guiding radiative pump energy and/or injected electrical current into the one or more optical gain media regions for promoting interaction between the pump energy, the input optical signal(s) and the incorporated, rare earth elements. The incorporation of the one or more rare earth elements may include the provision of one or more binding agents such as oxygen for enhancing binding between the rare earth elements (e.g., Er) and the host material (e.g., monocrystalline Si) and/or the provision of one or more trapping layers (e.g., amorphous Si and/or amorphous silicon oxide) so as to reduce out-diffusion of the incorporated rare earth element(s) and/or the provision of one or more rapid thermal treatment steps so as to activate the incorporated rare earth element(s) within their respective parts of the host material.

Other aspects of the disclosure will become apparent from the below detailed description.

BRIEF DESCRIPTION OF THE DRAWINGS

The below detailed description section makes reference to the accompanying drawings, in which:

FIG. 1 is a cross sectional side view of a conventional SOI (silicon on insulator) integrated device having rib waveguides;

FIG. 2A is a cross sectional side view showing a first step within a manufacturing process of the disclosure where an $SiO_2$ layer having a first refractive index ($n'_0$) is integrally provided on an Si substrate having a different, second refractive index ($n'_1$) and the first step optionally includes a surface incorporation process which incorporates one or more rare earth elements into a top surface of the silicon oxide layer and/or the step optionally includes an implanting process which implants rare-earth dopants deeper into the silicon oxide layer;

FIG. 2D is a cross sectional side view showing a fourth step within the manufacturing process continued from FIG. 2C wherein the second Si layer is patterned to define rib or other waveguide structures that include optical gain regions;

FIG. 3 is a top schematic view showing an integrated device in accordance with the disclosure that includes electrically and/or optically pump-able, optical gain regions, and where the pump-able optical gain regions are used to define various useful structures such as AWG's, optical switches, etc., in the integrated device; and FIG. 4 is a cross sectional side view showing another, integrated device in accordance with the disclosure that has metal or other reflective layers attached to it or integrally formed in it for reflectively distributing optical pump radiation through an optical gain region.

DETAILED DESCRIPTION

Figure 2B:
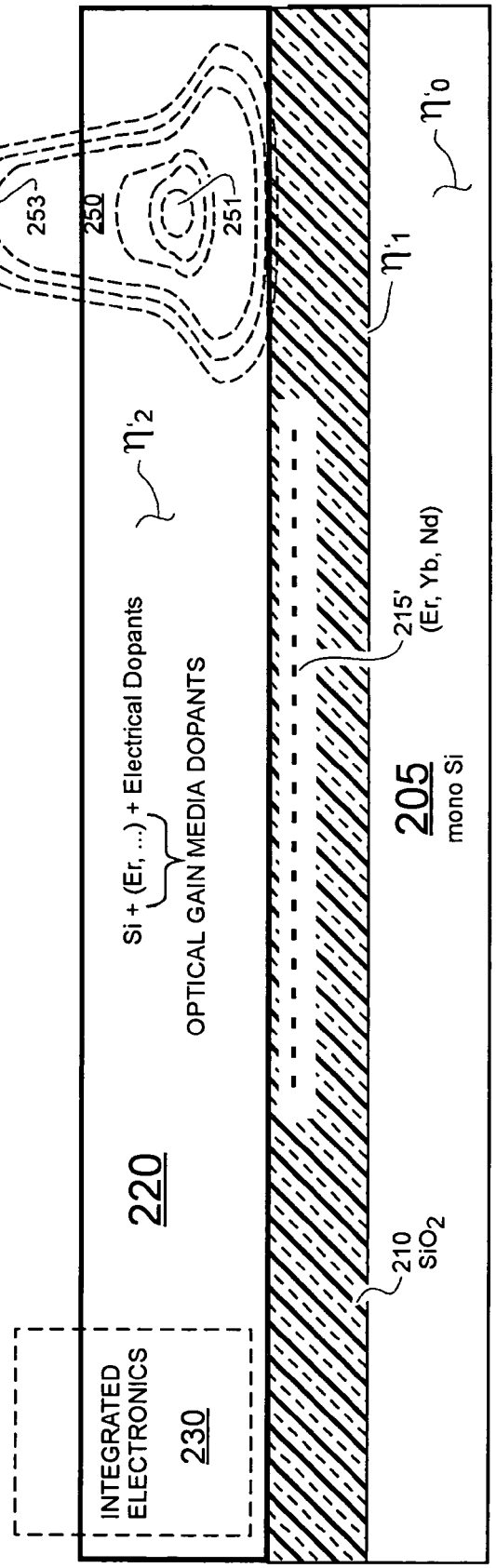
FIG. 2B is a cross sectional side view showing a second step within the manufacturing process continued from FIG. 2A where a second Si layer having a third refractive index ($n'_2$) is formed integrally on the $SiO_2$ layer (or separately and thereafter bonded on) so as to provide an integrated SOI device, and where the second step optionally includes the incorporation of rare-earth dopants into the second Si layer as that second Si layer is formed by vapor deposition (e.g., PVD, CVD, ALD), epitaxy or otherwise.

FIG. 1 is a combination of introductory block diagram and a cross-sectional side view of a conventional SOI (silicon on insulator) integrated device 100 whose upper silicon layer has been patterned to define a pair of rib-style optical waveguides. The rib portions are identified as 140 and 142. An integrated electronics circuit is schematically shown to be present in or around region 130.

More specifically, the illustrated device 100 is structured to have a monocrystalline silicon substrate 105 having a respective first refractive index, $n_0$, and a respective first thickness, $D_{05}$. A silicon dioxide layer 110 has been thermally grown or has been otherwise formed on the substrate 105 to provide a second layer of a respective second refractive index, $n_1$, and a respective second thickness, $D_{10}$. A polysilicon layer 120 (it could be or include amorphous material) has been provided on top of layer 110 by, for example, chemical vapor deposition (CVD) or otherwise to thereby provide yet another region of a respective third refractive index, $n_2$, and a respective third thickness, $D_{20}$. Alternatively, layer 120 could have started as a monocrystalline and separately grown silicon layer that has been bonded onto the substrate (105) plus dielectric layer (110) through well known wafer bonding and layer separation techniques. Part of that original, third thickness, $D_{20}$ of layer 120 may have disappeared due to planarization (e.g., CMP), etching or other fabrication processes. The various fabrication processes that had been used, left behind the illustrated, upwardly projecting ribs, 140 and 142.

In yet another embodiment, silicon layer 120 can be monocrystalline and the buried silicon oxide layer 110 may have been provided for example, by implantation of oxygen (SIMOX process). The point is that there are many possible ways to form silicon-on-insulator (SOI) structures. Various electronic components such as field effect transistors and so forth may be fabricated in the regions schematically represented as 130 using the first and second semiconductor layers, 105, 120 and the intervening dielectric layer 110 as a basis for forming such electronically-functional components 130. Various proposals abound for how to operatively integrate the electronic functionalities of components 130 with optical functionalities provided by rib structures such as the integrated 140 and 142.

Rib portions 140 and 142 define respective parts of larger rib-type optical waveguides, where the optical waveguides may be used for confining and guiding the transmission of photonic signals through them. For the sake of convenience, the larger "waveguides" will be identified by the same reference numbers (140 and 142) that are used to identify their respective and upwardly-projecting rib portions (where the rib portions are the portions of layer 120 that project upwardly by respective heights, $H_1$ and $H_2$). Confinement of the transmitted photonic signals occurs because of the regions of different effective refractive indices surrounding the signals. More specifically, waveguide 140 is understood to include its respective and upwardly projecting rib 140, where rib 140 has a height dimension of $H_1$ and an effective width dimension of $W_1$. Waveguide 140 is understood to further include a below-rib depth dimension, $D_1$, as shown. The different effective refractive indices of the materials within the regions of the ribbed waveguides (e.g., the $n_2$ of silicon layer 120) and of those surrounding the ribbed waveguides (namely, the $n_1$ of layer 110 and the $n_3$ surrounding rib 140 from above—where the top surrounding material can be air, or a silicon oxide, or a silicon nitride) tend to cause an appropriately injected, optical signal to be confined within the area of the rib and just below it, as is loosely represented by the triple arrow-headed symbol at 145. The upper surrounding material, incidentally, shown around rib portion 140 may define part of an optional cladding layer 141.

Symbol 145 is intended as a crude introduction. Optical intensity distribution and confinement is more precisely shown in the adjoining rib waveguide 142. As seen, rib waveguide 142 has a respective height $H_2$, width $W_2$, depth $D_2$, and a separation distance $S_{12}$ spacing it away from the first rib portion 140 of the first waveguide (the one covered by cladding 141). Dashed iso-intensity lines are used to represent the different intensity regions of a confined optical signal 150 that may be confined by, and transmitted by the second waveguide 142. The most intense portion of the photonic signal 150 is typically found in a core region 151 near where the rib meets with the bulk of layer 120. Typically, most of the signal's strength and intensity is maintained within the physical boundaries of the optical-signal conducting media as is represented by intensity outline 153. In some cases, a small portion of the signal intensity may transcend (effervesce) across the material boundaries and enter into adjoining regions as is represented by peripheral intensity outline 155. Specific behaviors of specific, optical signals may depend on a wide variety of factors including, but not limited to, signal wavelength, signal intensity, signal mode, distributions of effective refractive index values in and around the signal-conducting materials, linearity of the signal-conducting materials, and so forth.

FIG. 2A provides a cross-sectional side view of a first structure 200 that is in accordance with the disclosure. The illustrated structure 200 (substrate plus dielectric) is an in-process manufacture that is being created to support a future guided transmission of—when fabrication of the manufacture completes—a first photonic signal 250 (where signal 250 is represented in dashed intensity outline form with its peak intensity at core region 251). Substrate layer 205 of the structure 200 can be comprised of monocrystalline silicon or it may be comprised of another type of semiconductor (e.g., SiGe, GaAs) having monocrystalline or another crystalline structure. Substrate 205 may additionally be made of other rigid support materials (e.g., metals, ceramics, etc.) appropriate for use in the fabrication of miniaturized optical and/or optoelectronic devices.

The dielectric layer 210 of structure 200 may be thermally grown silicon dioxide or it may be spun-on glass or another type of electrically insulating and/or optically useable material including, but not limited to, silicon dioxide, silicon nitrides and silicon oxinitrides. An amorphous surface region of an electrically insulating and/or optically useable material including, but not limited to, silicon dioxide, silicon nitrides and silicon oxinitrides may be deposited (via CVD or otherwise) at the top of layer 210 (not separately shown) to provide a rare earth trapping function as shall be further explained below. If photonic signal 250 is to be cleanly guided within a next-formed layer 220 (see FIG. 2C), then the top of layer 210 should be appropriately smoothed (e.g., by chemical mechanical polishing (CMP), etching and/or otherwise) for providing good reflection and/or refraction without distortion. Although not shown, a blanket-wise or patterned film of reflective metal (e.g. aluminum, gold, etc.) may be interposed between layers 205 and 210 (or provided below substrate 205) in some embodiments for providing reflective optical properties and/or optional electrical conduction properties. In some cases, dielectric layer 210 may be used for conducting optical signals and in such cases, the thickness of layer 210 may have to be made fairly large, say greater than 5 microns (e.g., about 7 to 10 microns) in order to contain an optical signal inside the dielectric layer. Also, if this is the case, the upper silicon 220 (FIG. 2B) may not be needed for providing confined transmission of optical signals However, in most cases when the next-to-be formed, upper silicon layer 220 (FIG. 2B) is present, the thickness of layer 210 can be quite small, say on the order of about 1 micron or less.

Unlike the conventional case of FIG. 1, the in-process manufacture 200 of FIG. 2A may be modified to include the incorporation of one or more rare earth elements such as erbium (Er), ytterbium (Yb), neodymium (Nd), and so forth into appropriate parts (e.g., 215 and/or elsewhere) of structure 200. The location of incorporation (of Er, Yb, Nd, etc.), and the concentration of incorporation, may depend on where and how optical signals (e.g. 250) are to be transmitted and what attendant gain or reduction of propagation loss is desired and what effective (optically activated) rare earth concentrations can be achieved within the corresponding host materials (e.g., the SiO2 of layer 210). In the case where photonic signals are to be transmitted through a silicon layer such as 220 (shown in FIG. 2B), the rare earth incorporation process 221 may use a deep energetic implant into layer 220 so that the so-incorporated rare earth element(s) 225 are trapped well below the surface. Additionally, at least part of rare earth enriched layer 220 (e.g., a top surface part) may be formed as amorphous silicon or an amorphous dielectric (e.g., $SiO_2$) and the like to provide higher doping concentration for the to-be-incorporated rare earth elements. In one embodiment, alternating layers of relatively thin, amorphous dielectric and/or relatively thin, amorphous semiconductor are deposited along with layers of polycrystalline semiconductor (e.g., N or P type poly-Si) so as to provide a rare earth trapping function. The incorporated rare earth element(s) may be optically activated (e.g., operatively bounded to the host material) by performing one or more rapid thermal anneal steps after the amorphous trapping layer(s) are formed. In one embodiment, each rapid thermal anneal is constituted by use of IR lamps and/or microwave emitters which rapidly raise the surface temperature to about 900° C. to 1200° C. for about 30 seconds or less (e.g., 10 seconds or less) to several minutes. The rapid thermal anneal can cause the incorporated rare earth element(s) (e.g., Er alone or as part of a binding compound like $Er_2O_3$) to operatively bind to the surrounding host material (e.g., Si or silicon oxide) so as to later provide an optical gain function and/or and optical signal reconditioning function.

Concentrations of the incorporated rare earth elements such as illustrated at 215, 225 (FIG. 2C), etc. may vary depending on the solid solubilities of the incorporated rare earth elements in the host material(s). A workable concentration is typically on the order of about $10^{18}$ atoms/cm$^{-3}$ (10E+18 atoms/cm3) or greater for the respective rare earth atoms in the host materials of the supporting layers (e.g. 220 and/or 210). Higher concentrations may be desirable. The effective concentrations which are used will depend on the gain to be achieved and on other appropriate considerations, including the ability to operatively bind the incorporated rare earth atoms to their host material(s) in a gain providing, distributive pattern. One method for keeping the rare earth dopant ions fixedly bound in the host material(s) so that they do not diffuse out during activation thermal anneal or over time, and appropriately distributed in the host matrix is to distributively add oxygen and/or another binding agent into the host material so as to generate binding complexes like Er—O—Si rather than merely just trying to keep the Er atoms dissolved by themselves in the solid matrix of the host material(s). Er concentrations of about $5 \times 10^{19}$ atoms/cm$^3$ in silicon are possible if oxygen binding is used as a solid solubility enhancer. Another method of enhancing the solid solubility is to intermix a compound composed of the binding agent and the rare earth element (e.g., $Er_2O_3$) into the host material as the host material is being vapor deposited, spun on, or other wise formed. Yet another method is to form one or more, amorphous trapping layers. (The amorphous trapping layer technique is simultaneously good and bad. It helps to better trap the rare earth elements in the host material, but it also degrades the optical quality of the host when compared to a host made entirely of monocrystalline or polycrystalline material.) Rapid thermal annealing or other techniques may be used to optically activate the binding complexes (e.g., Er—O—Si). A relatively pure version of the rare earth element (e.g., Er) may be mixed in at the same time as the bind/rare compound (e.g., $Er_2O_3$) is admixed into the being-formed, host material. Alternatively or additionally, the binding agent(s) (e.g., oxygen, nitrogen, sulfur, etc.) may be added in by ion implant or it may be sourced from a CVD carrier gas. As a result, different ratios of binding agent (e.g., oxygen) to rare earth element (e.g., Er) may be obtained even though the stoichiometry of the bind/rare compound (e.g., $Er_2O_3$) may suggest otherwise.

By using an appropriate one or more binding agents for forming rare earth binding complexes (e.g., Er—O—Si) it is possible to increase the amount of Er dopant atoms that become fixedly embedded within the host material and that do not diffuse out during thermal activation or over time (over the long term—during the operative life of the device, which could be longer than 5-10 years), where this increase is seen in relative comparison to what effective rare earth concentration would result from simply mixing in just the elemental version of Er (or of one of the other rare earth elements) alone into a generally solid solubility limited host material (e.g., silicon). When the concentration of the fixedly incorporated, rare earth element(s) is increased by use of one or more, solubility-increasing techniques (e.g., by admixing bind/rare compounds such as $Er_2O_3$, ErN, and/or ErS as well as amorphous material trapping), the gain media has more rare earth atoms present for interacting with signal and with the pump radiation. The increased concentration of rare earth element(s) can provide for a more efficient optical amplification mechanism.

As already indicated above, an additional or alternative way of retaining more Er atoms in a host material such as silicon is to use an amorphous form of the host (such as amorphous silicon or amorphous silicon oxide or the like) as one or more intermediate trapping layers (thin) and/or as a capping layer (thicker) and/or as a foundation layer to thereby prevent the out-diffusion of the rare earth element (e.g., Er) from the hosting material. The optical transmitting quality of the amorphous material may not be as good as that of a monocrystalline form of the same host material, but a compromise can be made by interlacing relatively thin layers of the amorphous form with thicker layers of the non-amorphous form. Use of one or both of amorphous host material and/or binding complexes allows for higher concentrations of the rare earth atoms (e.g., erbium atoms) to be fixedly retained in the host material than would be allowed by the normal solid solubility limit of just a simple, non-amorphous form of the host material. Accordingly, by using rare earth/bind compounds (e.g., ErO, ErN, ErS) which better bind to the host material and/or by using amorphous trapping layers, it is possible to incorporate a higher, operative concentration of the rare earth atoms into the host material (e.g., silicon). After appropriate trapping and/or binding areas are formed in the host material complex, the attainment of yet higher concentrations of rare earth elements may be had by way additive, energetic ion implant of the one or more rare earth elements followed by rapid thermal annealing to encourage distributive diffusion and activation of the additional rare earth moieties, where the moieties can even enter from an adjoining upper or lower boundary.

With the above in mind and referring now to FIG. 2B, a side cross-sectional view is shown of an in-process manufacture 201 whose fabrication has been continued from that of FIG. 2A. In a next manufacturing step 221, a host material layer 220 which can provide an optical wave-guiding function and can optionally provide an electrical conduction function is being formed. In one set of embodiments, the being-formed new layer 220 is comprised of silicon and/or other semiconductor materials such as SiGe or III-V compounds such as GaAs, GaAlAs, InP, InGaAs, InGaAsP and the like. The being-formed new layer 220 may additionally alternatively be composed of other optical dielectric materials such as silicon dioxide. Formation of the new layer 220 may take place in a location spaced away from the initial combination of substrate 205 and dielectric 210 and new layer 220 may thereafter be bonded on by way of known wafer bonding techniques. In view of this, the new layer 220 may be separately grown as a monocrystalline layer and thereafter optionally capped with an amorphous Si or amorphous $SiO_2$ layer (to provide the rare earth trapping function). One or more rare earth elements may be incorporated into the separately grown or otherwise added-on, new layer 220 using the concentration enhancing techniques discussed above.

In one set of embodiments, the refractive index $(n'_2)$ of layer 220 is greater than that $(n'_1)$ of layer 210 and greater than that $(n'_3)$ of air or an optional cladding layer (235 in FIG. 2D) that will be provided later. As a result, an optical wave-guiding channel is provided. Methods for attaching the new layer 220 to the initial combination of substrate 205 and dielectric 210 may include direct wafer-bonding or chip-bonding, and/or use of vapor deposition techniques such as chemical vapor deposition (CVD) or atomic layer deposition (ALD) or other forms of deposition including physical vapor deposition (PVD) and/or other appropriate methods for forming semiconductor on insulator structures (SemOI). Alternation between amorphous deposition and non-amorphous deposition may be carried out by known techniques for encouraging formation of the respective amorphous and non-amorphous forms of the host material. Optional masks 226 may be used during formation of new layer 220 for precluding formation of the wave-guiding material (220) and/or rare-earth-doped (RED) versions of it in certain regions of the ultimately-formed integrated device (204 of FIG. 2D). As indicated in FIG. 2B at 221, the formation of the optical wave-guiding channel layer 220 may comprise the inclusion of one or more rare earth elements (and/or rare earth compounds) in the vapor deposition atmosphere used to form one embodiment of layer 220. The inclusion of the one or more rare earth elements may occur otherwise if other means (e.g. selective atomic layer deposition or ALD for example) are used for fabricating layer 220. The incorporation during-formation (221) of the rare earth element(s) (e.g., Er) may occur with a homogeneous concentration of the rare earth atoms through all depths of the optical wave-guiding channel layer 220 or alternatively, the rare earth concentration may be graded (graduated, smoothly or discretely) as may be deemed appropriate. Additional rare earth elements may be diffused upwardly from the top layer of the previously incorporated rare earth elements 215' on dielectric layer 210 during the use of rapid thermal annealing.

Figure 2C:
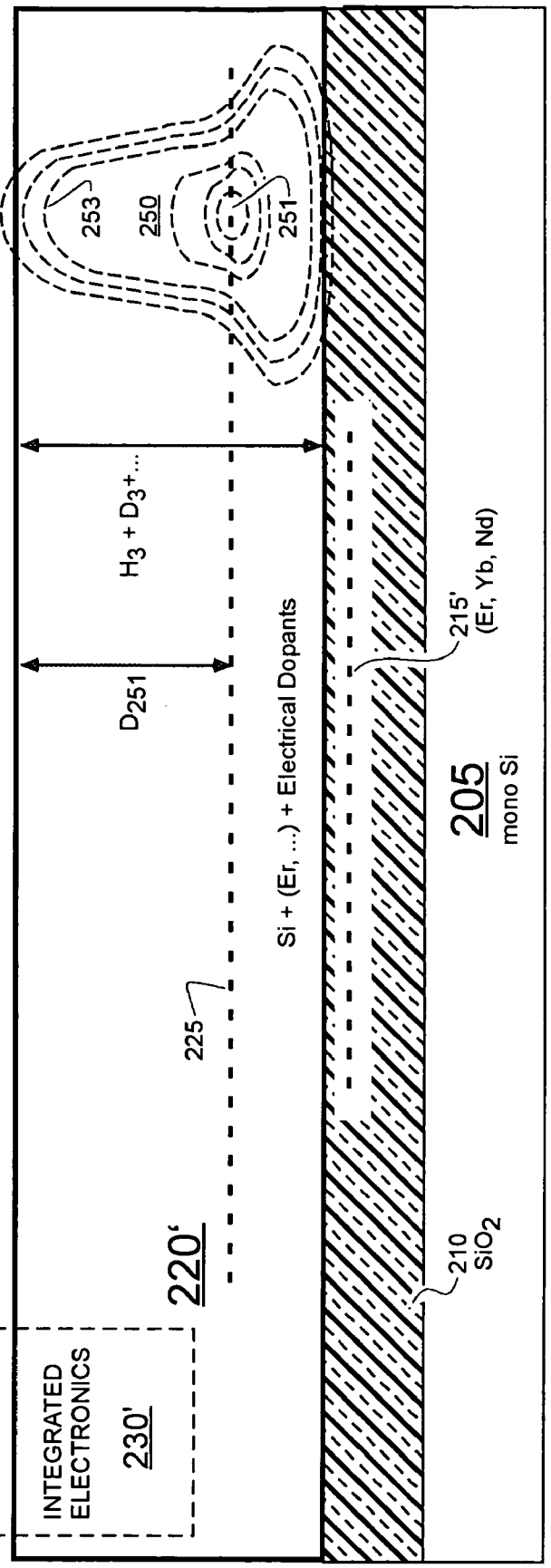
FIG. 2C is a cross sectional side view showing a third step within the manufacturing process continued from FIG. 2B wherein rare-earth dopants are optionally implanted or otherwise further incorporated (e.g., diffusion, growth) into the second Si layer.

Referring next to FIG. 2C, a side cross-sectional view is shown of the continuation of the in-process structure 202 after the optical wave-guiding channel layer 220' has been formed to a sufficient thickness (H3+D3+ . . . ) to support the planned-for rib and/or ridge structure. More specifically, if one of the rib waveguides (see 243 of FIG. 2D) is to have a rib height of H3 and a depth of D3, then the pre-patterned version 220' should have a sufficient thickness (H3+D3+ . . . ), where the "+ . . . " factor accounts for material loss due to planarization and/or etching. In one set of embodiments, the pre-patterned thickness (H3+D3+ . . . ) is about 1 to 10 microns.

At this stage in the fabrication (FIG. 2C), an additional or alternative rare earth implant and/or surface deposition 222 may be carried out. The surface deposition may be followed by subsequent, rapid thermal drive in into the underlying material 220. The optional ionic implant may be configured for providing one or more concentrations of desired and incorporated rare earth element(s) at respectively appropriate depths—such as at $D_{251}$—for providing a higher concentration of rare earth elements (e.g. Er) at depth level 225. This depth level 225 may align approximately with the core concentration region 251 expected for the planned and to-be guided, optical signal 250. The rare earth implant and/or surface incorporation 222 may be performed blanket-wise or masked as appropriate, followed by rapid thermal anneal. Incorporation patterning mask(s) such as schematically represented at 227 is/are therefore optional. The optional mask(s) 227 may be used to protect the planned-for integrated electronics region 230' from being contaminated by optical dopants (rare earth and/or others). As will be understood by those skilled in the art, the electrical conduction and/or optical wave-guiding channel 220' may comprise one or more semiconductors (e.g., Si, SiGe, GaAs, etc.) and one or more optical dopants (e.g., Er, Yb, Nd, etc.) and/or electrical conductivity-providing dopants such as arsenic, phosphorous and boron. In an alternative embodiment where the optical/electrical guiding channel layer 220' is monocrystalline, the insulator layer 210 and/or one or more, very thin, rare earth trapping/binding layers (not explicitly shown) may be formed by implant of oxygen and/or nitrogen in accordance with well-known SIMOX processes. Substantially thicker versions of dielectric layer 210 may be provided for with a combination of thermal oxidation of substrate 205 prior wafer bonding of new layer 220' onto dielectric layer 210.

Referring next to FIG. 2D, a further side cross-sectional view is shown of a continued version 204 of the in-process manufactured structure. At step 234 plasma etching or other etching and/or other patterning means are used to form desired optical waveguide ribs and/or ridges and/or other optical structures as may be appropriate. At the same time that the optical portion of the electrical-conduction and/or optical wave-guiding channel 220" is patterned to form ribs 243, 244, 245, etc., appropriate etching may be provided for the integrated electronics region 230", such as for fabricating transistors, diodes (including photodiodes), etc., as may be desired. Various masks 228 may be employed for determining the patterns in the different regions of the overall structure 204. Further electrical insulation and/or optical cladding layers may be provided in step 235 with appropriate optional masks if desired. The electrically isolative and/or optically-passivating cladding layers may be comprised of silicon oxides, silicon nitrides or other appropriate materials. In some embodiments, no cladding is needed for the optical ribs and air may be used as an appropriate refractive index medium for reducing cost and process complexity. Optical waveguide ribs such as the illustrated 243, 244 and 245 may be additionally or alternatively formed by selective deposition of optical wave-guiding channel material as opposed to subtractive etching. The selectively added, wave-guiding channel material may have rare earth elements incorporated into it per the above descriptions.

The resulting product 204 of FIG. 2D is shown to include two relatively close together waveguide ribs, 243 and 244, that have a rib separation distance of $S_{34}$. Respective waveguide widths $W_3$ and $W_4$ may be the same, or different, depending on the planned confinement configurations of respective optical signals 250 and 257. Waveguide rib heights $H_3/H_4$ and waveguide channel depths $D_3/D_4$ may similarly be the same or different for the respective waveguide ribs depending on the planned confinement outlines and possible interactions between the different optical signals 250 and 257. Rare earth doping profiles may be adjusted in different regions of the structure 204 to accommodate for different expected positions of optical signal cores (e.g., 251) for respective ones of the signals and their interaction regions.

In the illustrative example of FIG. 2D, ribs 243 and 244 may define parts of a so-called 3 dB coupler or parts of a Y-shaped optical junction. One of signals 250 and 257 may represent pump-energy radiation while the other represents an information-conveying signal or both may be information signals that are being cross-modulated. Appropriate signal amplification and/or cross-modulation may begin in overlap region 258 where the signals cross over with one another and with the rare-earth doped optical channel media (220"). In the case of a Y-shaped junction, the cores (e.g. 251) of the respective optical signals 250 and 257 should meet with one another and simultaneously overlap with the highly concentrated rare earth level 225' as the Y-junction closes together. Although not shown in FIG. 2D, various vertical isolation regions (e.g. trench isolation) may be provided in the optical/electrical conduction channel 220" for providing better isolation between different conduction regions of that layer 220". The isolation regions may be filled with silicon oxide, silicon nitride or other appropriate optically-isolating materials or structures. Additionally, optically reflective metal layers (e.g. aluminum, gold, etc.) may be provided on top of the cladding 235 or directly on the waveguide ribs 243, 244 (cladding not shown) for providing optical reflecting functionalities if so desired. The same or different metal layers may also provide electrically conductive functionalities and/or electric field generating functionalities for forming optical phase-shifting modulators (e.g., temperature modulated) and/or electrical circuits as may be appropriate.

FIG. 3 is a top schematic view of an integrated electrical and optical circuit 300 in accordance with the disclosure. Structures shown schematically within device 300 are exemplary of the uses which may be advantageously obtained when rare-earth doped semiconductor material is are made available in a semiconductor-on insulator (SemOI) configuration such as has been described herein.

Item 301 represents an input optical fiber which may be coupled to the monolithically or otherwise integrated device 300. Various fiber-to-chip coupling mechanisms may be used. FIG. 3 shows an optical focusing mechanism 302 (represented by a spring-like figure) as being used for focusing the output beam of fiber 301 into an on-chip waveguide 303. This is an exemplary schematic representation. Practical fiber-to-chip coupling schemes may include standard fiber pig-tail connections, butt-coupling of the fiber to the on-chip waveguide by using, for example, a UV curable index matching fluid (UV glue) with or without optical mode matching/conversion, using a fiber in combination with a microlens and/or using a lens-tipped fiber termination for the coupling. An opposed end (right side) of waveguide 303 is schematically shown to be operatively coupling the transmitted signal via another optical coupler 304 and to output fiber 305. In one embodiment, the entire optical guiding/electrical conduction channel 320 is blanket-wise doped with Er and/or another rare earth element using one or more of the concentration enhancing techniques described above. However, showing activated incorporation of rare earth atoms everywhere would obscure the illustration of other aspects of device 300. Accordingly, a first Er-enriched set of regions 321a-321b is shown to be provided at the input side of waveguide 303 for amplifying a supplied C-band input signal 311 that is directed into the left side of the waveguide 303 from input fiber 301. In other words, input signal 311 has a left to right traveling direction in the illustrated example.

In one embodiment, electrical pump energy is supplied into the semiconductor material of Er-enriched sub-region 321 a by way of electrically conductive (e.g., metallic) electrodes 371 and 372 provided around this sub-region 321a. The electrically conductive electrodes 371 and 372 may be provided oppositely on side walls of the waveguide rib (303) and/or they may be provided oppositely or otherwise along upper and lower boundaries of the waveguide 303 and/or its surrounding material. In the illustrated example, electrode 371 is grounded while electrode 372 is driven by a current source 375 coupled to a $V_{cc}$ voltage source of the chip 300. Electrical current flow within Er-enriched sub-region 321a can provide carrier injection and consequential amplification energy for amplifying the input information signal 311 that is traveling along the optically confining and guiding parts of the rare earth enriched, waveguide 303. The electrically conductive electrodes 371 and 372 may extend along the entire length waveguide 303 or repeated copies of charge pump 375 and the electrodes may be provided along the entire length waveguide 303. However, showing this everywhere would obscure the illustration of other aspects of device 300. Accordingly, the electrically pumped aspect is shown only in sub-region 321a as an example of how electrically-driven amplification of a supplied input signal 311 may be carried out. Current source 375 may, of course, be electrically modulated if desired so as to encode an intensity modulated signal on the optical carrier of signal 311.

The electrically-amplified optical signal 341 may alternatively or additionally be boosted and/or reconditioned by photonic pump energy obtained from a supplied optical pump signal 315. In FIG. 3, optical signal 341 is shown continuing along waveguide 303 towards a second Er-enriched region 322. (Once again, the intent is to indicate that the entire optical/electrical conduction channel 320 is blanket-wise doped with Er and/or other rare earth elements. However, showing this everywhere would obscure the illustration. Accordingly, the schematic shows separate regions like 321a, 322a, 322.) The second, rare-earth-element(s) enriched region 322 is shown to be receiving photonic pump energy received from a supplied optical pump signal such as 315. Pump signal 315 is shown as being input from a second fiber 305 and as traveling in a right-to-left direction after being coupled into the right side of waveguide 303 by an appropriate, fiber to chip coupling means (e.g., a pigtail coupler) 304. The right-to-left traveling pump signal 315 interacts with the Er-enriched region 322 and with the oppositely-traveling information signal 341 to thereby provide further amplification and/or signal reconditioning and to thereby produce the left-to-right traveling, optical output signal 319. Optical output signal 319 is coupled in the left-to-right direction out of waveguide 303 and into output fiber 305. This coupling may be achieved by the Y-shaped coupler 304 or otherwise. The output optical signal 319 (e.g., a C-band signal) does not have to travel along the same fiber 305 that brings in the pump signal 319. They can travel along different fibers and/or other pathways in addition to their shared travel through waveguide 303. In one embodiment, the optical pump signal 315 is allowed to continue along path 316 from region 322 into Er-enriched regions 321a, 321b so that the entire length of waveguide 303 is pumped by the photonic energy supplied by pump signal 316. In an alternate embodiment, the out-flowing pump signal 316 may be selectively directed away from region 321 for any of a number of reasons, including for providing modulated amplification to output signal 319 if such is desired.

It should be noted that the pump signal 315 is flowing in a direction opposite to the information carrying signals 311, 341 and 319. Accordingly, no special requirements are needed for filtering out the pump signal while extracting the information signal 319. In an alternate embodiment, the pump signal may flow in the same direction as the information carrying optical signal. In yet another embodiment, pump signals are supplied from both ends of waveguide 303 and flow both in the same direction as the information carrying signals and opposite to them. Waveguide 303 may be structured to carry optical information signals bidirectionally; both from left to right and from right to left. In any case, optical isolation of pump and signal beams may be used.

FIG. 3 shows by further example how a so-called Arrayd WaveGuide (AWG) may be fashioned with the here disclosed technology. Those skilled in the art will appreciate that AWG's may be used for frequency-domain multiplexing or de-multiplexing. Multiple input wavelengths can be split into individual wavelength each carrying information for use by a given user, or alternatively, multiple wavelengths from different users can be combined into one single communication path for porting into a single fiber for transmission. Phase-shifting modulators may be optionally included in each of the waveguides for further, fine control and the latter one or more phase-shifting modulators (e.g., temperature modulated) may be controlled by integrated electronics 330. The phase shifted outputs may then be used as appropriate.

Aside from schematically showing AWG(s) 350, the bottom portion of FIG. 3 shows more generally how the rare earth enriched portions of the monolithic device 300 may be used to provide optical and/or electro-optical functionalities with reduced loss or above-unity gain. Since the electro/ optical wave-guiding channel 320 of the device 300 is blanket wise and/or selectively enriched with Er and/or other rare earth elements, all optical and/or electro-optical components (e.g., AWG's 350) that guide and/or otherwise process optical waves through the rare earth enriched portions 320 of the monolithic device 300 can have their signal loss reduced and/or they can be made to exhibit unity or above-unity gain and/or they can be made to provide pulse-shape reconditioning on a selective or continuous basis (e.g., if Raman mode operation is used) as desired. The rare earth enriched media of each of the optical and/or electro-optical components (e.g., AWG's 350) may be respectively pumped, each on a continuous or selectively modulated basis, with one or more supplied amounts of pumping energy of appropriate wavelength so as to provide the desired signal amplification and/or reconditioning.

In one embodiment, the pumping energy can include oppositely and/or orthogonally directed radiant energy 345 or other, non-parallel traveling radiant energy (not shown), where the term, "non-parallel traveling" is to be understood herein to apply to any radiant energy, like 345, which travels within the rare-earth enriched media 320 (e.g., Er enriched) in a direction that is substantially different from the input-to-output flow direction of most information carrying optical signals in a corresponding component (e.g., AWG 350) provided within the device 300. More specifically, if a left-to-right flow is assumed (in the +X direction) for the information carrying optical signals (e.g., signal 311) of device 300, then the traveling direction in the rare earth enriched media should be, for at least a majority of the injected, radiant pumping energy 345, one that is substantially different than the left-to-right direction. For example, the pump energy traveling direction could be in the right-to-left direction and/or in the up/down direction (roughly the ±Y direction) as is illustrated within the example of FIG. 3 (where the device 300 is being viewed from above its top, along the Z axis). Radiant pump energy can alternatively or additionally be traveling roughly in the ±Z directions. The internally reflected paths of the radiant pump energy may include 3-dimensionally zig-zagging or rotationally spiraling (or helical) paths. Such non-parallel traveling paths for the radiant pump energy allow the resulting, informational output signals to be easily extracted from the device 300 with no or substantially little interference or intermixing of the pump energy 345 within the extracted information signal (e.g., 319).

The optical or electro-optical components of the integrated device 300 (it can be a monolithically integrated device) are not limited to waveguides (e.g., 303) and AWG's (e.g., 350). The rare earth empowered components of device 300 may further include: (a) other optical signal de-multiplexers of either spatial or wavelength domain, such as schematically shown at 360 (the inputs are shown as being inherently amplified), (b) optical signal multiplexers such as is schematically shown at 370 (the outputs are shown as being inherently amplified), (c) optical phase modulators (not explicitly shown), (d) optical signal cross-modulators (not explicitly shown), (e) gratings (not shown), (f) wavelength routers (which provide wavelength division signal steering), (g) star couplers, (h) matrix switches, and so forth.

If desired, fixed and/or movable and/or variable mirrors (e.g., MEM's mirrors) such as the example shown at 346 may be provided at the periphery of the monolithic device 300 and positioned adjacent to the enriched electro/optical conducting channel 320. Alternatively or additionally such mirrors be provided inside the boundaries of device 300, such as for example, in etched-out trenches which expose the enriched electro/optical conducting channel 320. These mirrors may be used to bounce the pump energy back and forth in the non-parallel traveling directions. More specifically, entrenched mirror 346 is shown to be reflecting pump energy 345 in the generally up and down direction (±Y) of FIG. 3 and directing the reflected pump energy back into the rare-earth enriched, wave-guiding channel 320 so as to improve (e.g. optimize) energy transfer from the radiant pump energy signals 345 to the being-amplified, information signals (e.g., 311). Amplification may be of Raman and/or non-Raman type as may be appropriate. Alternatively or additionally, electric current injectors such as shown at 375 may be distributed about the enriched wave-guiding channel 320 for providing further or alternative pump energy.

FIG. 4 is side sectional view of one embodiment 400 wherein reflective mirrors are provided at least along the top and bottom major surfaces of an SOI structure. More specifically, the integrated, optical amplification device 400 includes an orthogonally pumped, Er-doped, Raman amplifier 485 (ERDA) whose structure shall be further detailed shortly. Like numbers in the "400" century series are used, where practical, for elements corresponding to earlier ones described for the "200" series and thereafter of the above described drawings. Integrated optical device 400 is a multi-layered device having a plurality of metal layers. The substrate 405 is understood to be composed of monocrystalline silicon and/or another optical grade material and it is disposed under the first dielectric layer 410. Layer 410 is composed of optical grade silicon dioxide and/or another optical grade dielectric material as may be appropriate. Aside from poly-silicon or amorphous silicon and/or monocrystalline silicon, the substrate 405 may alternatively or additionally be made of other appropriate semiconductors (e.g., Ge) or semiconductor compounds (e.g., III-V compounds such as GaAs, GaAlAs, InP, InGaAs, InGaAsP, or II-VI compounds such as ZnS, ZnSb, and the like).

In the embodiment of FIG. 4, a first optical wave-guiding/electrically-conducting channel 420 is formed above dielectric layer 410. The first optical/electrical channel 420 is rare-earth enriched (e.g., Er enriched) in accordance with the above descriptions. This optical/electrical channel 420 may be patterned and/or otherwise structured in accordance with the descriptions given above to provide various passive and/or active optical components including AWGs, other optical multiplexers, demultiplexers, spatial and wavelength domain routers, switches and/or electrically-driven optical phase modulators as may be desirable. Integrated electronics (not shown) may be further incorporated in the rare earth enriched, electrical/optical channel 420 to provide control signals as appropriate. In one embodiment, a separate, monolithically integrated device 435, comprised for example, of III-V semi-conductor compounds is bonded (e.g. flip-chip bonding) or it is otherwise operatively coupled to the bottom of first device 400. It may be seen that a plurality of electrically-driven laser diodes 431, 432 and 433 are fabricated within the second device 435 for injecting pump energy 415 upwardly into the first device 400. Although not explicitly shown, laser diodes 431, 432 and 433 may be controlled by integrated electronics (not shown, but understood to be constituted for example by silicon-based electronic circuits) provided within the first device 400.

Provided on top of the first optical/electrical channel 420 there is a first mirror reflection (e.g. metal) layer 461 for providing optical reflecting functions and/or optional electrical interconnect functions. A second optional dielectric layer 462, which may be composed of silicon dioxide, silicon nitride and/or other appropriate materials is provide at least above the first reflecting metal layer 441 to protect the metal from chemical corrosion and/or unwanted electrical contacts. A second mirror reflection (e.g. metal) layer 441 for providing optical reflecting functions and/or electrical interconnect functions is provided below substrate 405. In the illustrated embodiment, this second reflecting mirror layer 441 is sandwiched between optional dielectric layers 440 and 442. One or more of dielectric and/or metal layers 440, 441, 442 may be monolithically integrated parts of device 400 or they may be bonded or otherwise provided adjacent to the bottom of device 400 as may be appropriate for respective applications. As in the case of the optional dielectric 462 for the first mirror layer 461, the optional dielectric layers 440, 442 for the second mirror layer 441 may be composed of appropriate materials and may provide hermetic sealing and/or electrical insulation functions as may be desire. In some embodiments, various ones of the dielectric layers 440, 442 and/or 461 may be dispensed with or additional ones may be provided (e.g., between 461 and the rare earth enriched layer 420).

Those skilled in the art may appreciate from FIG. 4 that the reflective metal layers 441 (bottom) and 461 (top) may function as mirrors for photonic beams that are applied at appropriate angles. (If desired other reflective or refractive means may be provided for 3-dimensionally confining the pump signal 415 to non-parallel pumping paths in accordance with what is shown.) A first opening 445 is provided in the bottom mirror combination 440-442 for allowing the externally-generated pump signal 415 to enter substantially orthogonally, but at a slight tilt angle (e.g., 0.5°~5° off the normal) relative to the reflecting mirror formed by combination 461-462. Pump signal 415 therefore bounces back and forth in a zig-zag manner as is indicated at 416 through the rare-earth enriched channel region 420. The pump signal may exit vertically upwardly as is indicated at 418 through opening 465 of the top mirror combination 461-462.

At the same time that pump signal 415 is traveling in a substantially non-parallel traveling direction (416) within rare earth enriched layer 420, an information containing optical input signal 411 is supplied parallel to the mirror structures at information signal input port 402. The amplified output signal 414 emerges from the opposite end of channel 420 through information signal output port 404. Because the information containing signal 411-414 and the pump signal 415 are traveling substantially non-parallel relative to one another, there is relatively little interference between the two and the output information signal 414 may be extracted alone. In the illustrated example, the injected pump signal 415 is directed to advance in a direction (−X) opposite to that (+X) of the input signal 411 so that the amplified output signal 414 may be easily extracted without having the pump signal intermingled nearby in the vicinity of the output port 404.

Aside from the bottom-side pump port 405, a top-side pump port 465 may be additionally provided as an opening in the top mirror structure 461-462. External pump signal 417 may be applied substantially orthogonally but at a slight tilt angle relative to mirror structure 440-442. Although not fully shown, it may be appreciated that the external pump signal 417 will zig-zag through the rare-earth enriched gain media 450 in a zig-zag manner similar to 416 but in the left-to-right advancement direction. Pump signal 417 may be oriented to also advance in the +Y direction so that pump signal 417 exits or terminates at a location spaced away from the information signal output port 404.

Photodiodes 431-433 may be arranged to provide different wavelengths of pump energy and/or combined energy intensity as may be appropriate for a specific application. Exit energy 418 may be cascaded into a further device like 400 if desired. Topside pump signal 417 may come from such a tandem other device. The pump energy entrance/exit ports 445/465 may be positioned so that multiple devices like 400 can be operatively stacked one on the other to share common pump energy. A variety of further enhancements may suggest themselves for FIG. 4 in view of the foregoing. By way of example, current source 475 may be integrally included in device 400 and/or may use a reflecting metal layer such as 462 as an electrode for injecting pump current into the rare earth enriched gain layer 420. The circuit or circuits for pump current may be closed via other conductors provided, for example, along the sides (+Y, −Y axis) of illustrated device 400.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

2'. Cross Reference to Patents . . . Continued From Top (B) U.S. Pat. No. 6,624,927, Wong et al, Sep. 23, 2003, {Short abstract: Design of fiber based Raman amplifier with tapered monitoring setup};

(C) U.S. Pat. No. 6,624,928, Masum-Thomas et al, Sep. 23, 2003, {Short abstract: Dual pumps at wavelengths below and above the fiber water peak through Raman scattering for amplification};

(D) U.S. Pat. No. 6,657,777, Meli et al, Dec. 2, 2003, {Short abstract: EDFA plus non-linear fiber for efficient Raman amplification—each wavelength or subband needs to be amplified and pumping can be done using semiconductor lasers};

(E) U.S. Pat. No. 6,657,778, Motoshima, Dec. 2, 2003, {Short abstract: Similar to U.S. Pat. No. 6,657,777, DEMUX plus individual channel amplification and MUX to form Raman amplification—each wavelength or channel needs to be amplified and pumped}:

(F) U.S. Pat. No. 6,631,028, Islam, Oct. 7, 2003, {Short abstract: Similar to U.S. Pat. No. 6,657,777 & 6,657,778};

(G) U.S. Pat. No. 6,618,192, Islam et al, Sep. 9, 2003, {Short abstract: Multiple Raman amplifiers in series for higher power output};

(H) U.S. Pat. No. 6,646,788, Islam et al, Nov. 11, 2003, {Short abstract: Multiple Raman amplifiers stacked together to have flat gain through different magnification of different amplifier};

(I) U.S. Pat. No. 6,587,606, Evans, Jul. 1, 2003, {Short abstract: Dispersion compensation regenerator using specialty fibers—both positive dispersion and negative dispersion to form soliton propagation so controlling the signal shape};

(J) U.S. Pat. No. 6,611,369, Matsushita et al, Aug. 26, 2003, {Short abstract: Gain media is specialty fiber which creates different speeds for light of different polarizations. Signal is amplified when running through such fibers with gain media};

(K) U.S. Pat. No. 6,556,339, Smith et al, Apr. 29, 2003, {Short abstract: Raman pumping perpendicular to the signal beam—solid state Raman gain media (laser) such as Barium Nitrate, Potassium Gadolinium Tungstate, Calcium Tungstate, Diamond, SiC and GaP—pump beam reflecting between prisms/mirrors multi-times for efficient Raman excitation};

(L) U.S. Pat. No. 6,600,597, Beeson, Jul. 29, 2003, {Short abstract: EDFA type amplifier using photonic crystal type (holo-capillary fiber) Raman gain media—pump beam and signal in opposite direction and gratings used for isolating pump and signal beams};

(M) U.S. Pat. No. 6,603,595, Welch, Aug. 5, 2003, {Short abstract: similar to U.S. Pat. No. 6,600,597};

(N) U.S. Pat. No. 6,178,036, Yao, Jan. 23, 2001, {Short abstract: Brillouin scattering based amplifier for sideband only amplification};

(O) U.S. Pat. No. 4,394,623, Kurnit, Jul. 19, 1983, {Short abstract: Raman gain media in a fiber capillary which is setup in a ring cavity};

(P) U.S. Pat. No. 5,796,906, Narayanan et al, Aug. 18, 1998, {Short abstract: A notch filter with input/output having single mode while middle part is multi-mode (can be two different sizes) which expands into higher order mode and creates extra-loss in related wavelengths—can be used for gain flattened EDFA};

(Q) U.S. Pat. No. 4,523,315, Stone, Jun. 11, 1985, {Short abstract: Raman gain media using gas (H2, O2, N2) phase diffusion into fiber};

(R) U.S. Pat. No. 6,603,785, Yoshida et al, Aug. 5, 2003, {Short abstract: Semiconductor MQW laser structure patent};

(S) U.S. Pat. No. 6,643,308, Tsukiji et al, Nov. 4, 2003, {Short abstract: Semiconductor pump laser design with diffraction gratings within the resonator to suppress injection current};

(T) U.S. Pat. No. 6,519,082, Ghera et al, Feb. 11, 2003, {Short abstract: XPU controlled feedback system for Raman amplifier};

(U) U.S. Pat. No. 4,575,645, Komine, Mar. 11, 1986, {Short abstract: Single cell used to generate Raman scattering and amplification by splitting a laser into coherent beams and running them in the same media in different directions}; and (V) U.S. Pat. No. 4,913,507, Stamnitz et al, Apr. 3, 1990, (Short abstract: Tapered fiber as physical constriction to change light density for generating non-linear optical phenomenon.

2b. Cross Reference to Related Other Publications

The following non-patent publications are cited here for purposes of reference and their respective concepts are also incorporated:

(A) A. Polman et al., "Incorporation of high concentrations of erbium in crystal silicon", Applied Physics Letters, Vol. 62 (5) pp. 507-509, Feb. 1, 1993;

(B) W. X. Ni et al., "Er/O and Er/F doping during molecular beam epitaxial growth of Si layers for efficient 1.54 um light emission", Applied Physics Letters, Vol. 70 (25) pp. 3383-3385, Jun. 23, 1997;

(C) Liu, X & Lee, B, "A fast and stable method for Raman amplifier propagation equitions" OPTICS EXPRESS Vol. 11, No. 18, pp. 2163-2176 (2003);

(D) Emori, Y & Namiki, S, "Demonstration of broadband Raman amplifiers: a promising application of high-power pumping unit" FURUKAWA REVIEW No. 19, pp. 59-62 (2000);

(E) L. H. Slooff et al, "Rare-earth doped polymers for planar optical amplifiers", Journal of Applied Physics Vol 91 (7) pp. 3955-3980. Apr. 1, 2002—{Note: this is a review article};

(F) A. Polman, "Erbium doped planar amplifiers", Proc. 10th European Conference on Integrated Optics (ECIO) Paderborn, Germany, April, 2001, p. 75 (2001); and (G) M. Krishnaswamy et al, "Optical Properties of Polymer Waveguides Dispensed on an Erbium/Ytterbium Codoped Glass" IEEE JOURNAL OF SELECTED TOPICS IN QUANTUM ELECTRONICS, VOL. 2, NO. 2, JUNE 1996 pp. 373-37.

2c. Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. An integrated device comprising:
   (a) a substrate; and
   (b) a Rare-Earth Doped Semiconductor layer (REDS layer) integrated with the substrate, where the REDS layer comprises one or more rare earth elements incorporated within a semiconductor host and where the REDS layer is patterned so that one or more patterned portions thereof define one or more optical signal processing structures having optical signal guiding abilities and optical signal amplifying and/or optical signal reconditioning and/or optical signal cross modulating abilities, where the optical signal processing structures each has:
   (b.1) at least a first optical signal port for receiving and confiningly propagating a respective information-carrying, first optical input signal, where said first optical input signal propagates through one or more of the REDS layer portions of the optical signal processing structure; and (b.2) at least one pump energy receiving means for receiving pumping energy in the form of at least one of electrical pump energy and/or optical pump energy, where the received pumping energy is operatively coupled by the at least one pump energy receiving means to one or more of the REDS layer portions of the optical signal processing structure for thereby providing optical signal amplification and/or optical signal reconditioning and/or amplified optical signal cross modulation with another optical signal for the received and confiningly propagated first optical input signal.

2. The integrated device of claim 1 wherein the first optical signal port of at least one of said one or more optical signal processing structures is structured also for outputting a respective information-carrying, first optical output signal.

3. The integrated device of claim 1 wherein one or more of the optical signal processing structures further includes:

(b.3) at least a first optical signal output port for outputting an information-carrying, respective first optical output signal corresponding to the received first optical input signal of the processing structure.

4. The integrated device of claim 3 wherein for at least one of said optical signal processing structures the operatively coupled pumping energy includes optical pumping energy and the operatively coupled optical pumping energy travels in a direction that is different than that of an output direction of the respective first optical output signal.

5. The integrated device of claim 1 wherein for at least one of said optical signal processing structures the operatively coupled pumping energy includes optical pumping energy and Raman type amplification occurs within said REDS layer where the corresponding, operatively coupled optical pumping energy is a Raman type pumping energy having an effective frequency which is about one optical phonon frequency higher than a signal frequency of an optical input signal supplied at the corresponding first optical signal port and the at least one pump energy receiving means is structured for receiving said Raman type pumping energy.

6. The integrated device of claim 1 wherein said optical signal processing structures include at least one of:

(b.3a) an arrayed set of waveguides;
(b.3b) an optical multiplexer;
(b.3c) an optical de-multiplexer;
(b.3d) an optical phase modulator;
(b.3e) an optical signal cross-modulator;
(b.3f) an optical grating;
(b.3g) an optical spatial or wavelength router;
(b.3h) an optical star coupler; and
(b.3i) an optical matrix switch.

7. The integrated device of claim 1 wherein (b.3) said one or more rare earth elements incorporated in the host of the Rare-Earth Doped Semiconductor layer (REDS layer) include at least one of:
(b.3a) erbium (Er);
(b.3b) ytterbium (Yb); and
(b.3c) neodymium (Nd).

8. The integrated device of claim 1 wherein (b.3) said one or more rare earth elements of the Rare-Earth Doped Semiconductor layer (REDS layer) include an effective and activated concentration of one or more rare earth elements at a predefined depth of the REDS layer for providing a substantial signal amplifying or signal reconditioning effect to a predefined guided optical signal of predefined wavelength that can propagate through the REDS layer.

9. The integrated device of claim 7 wherein (b.3a) said erbium (Er) is incorporated into the REDS layer to define an Er-enriched region having an Er concentration of about $10^{18}$ atoms/cm$^3$ or greater.

10. The integrated device of claim 1 wherein: the operatively coupled pumping energy includes optical pump energy and (b.2a) said at least one pump energy receiving means is oriented for causing said optical pump energy to enter the REDS layer at a tilt angle relative to a major plane of the REDS layer and thereby causes the optical pump energy to move in a zigzag manner through at least part of the REDS layer.

11. The integrated device of claim 1 wherein the operatively coupled pumping energy includes optical pump energy and the device further comprises:

(c) a first reflecting means provided adjacent the REDS layer for causing said optical pump energy to move in a zigzag manner through at least part of the REDS layer.

12. The integrated device of claim 11 and further comprising:

(d) a second reflecting means spaced apart from the first reflecting means and disposed to cause said optical pump energy to move in a zigzag manner through at least part of the REDS layer.

13. The integrated device of claim 1 wherein the operatively coupled pumping energy includes optical pump energy and the device further comprises:

(d) means for directing at least one radiating pumping beam of the optical pump energy in a non-parallel direction to cross non-parallel wise and more than once with one or more corresponding propagation paths of the first optical input signal in the REDS layer to thereby provide at least one of an amplifying effect and waveform reconditioning effect to the propagating through photonic signals of the corresponding propagation paths.

14. An integrated optical signal processing device comprising:

(a) a substrate; and (b) a semiconductive layer monolithically integrated with the substrate, the semiconductive layer including a semiconducting host material that is doped with one or more electrical conductivity-providing dopants and with one or more rare earth elements distributed in the host material so as to define a Rare-Earth Doped Semiconductor layer (REDS layer), where the REDS layer defines at least respective parts of one or more respective optical signal amplifying and/or optical signal reconditioning structures each having:

(b.1) at least a first optical signal port for receiving a respective first optical input signal; and (b.2) at least one respective pump energy receiving region for receiving pumping energy in the form of at least one of electrical pump energy and/or optical pump energy, where the received pumping energy is operatively coupled to one or more of the rare earth elements of the REDS layer for thereby providing optical signal amplification and/or optical signal reconditioning for the respective first optical input signal of the respective optical signal amplifying and/or reconditioning structure.

15. The optical signal processing device of claim 14 wherein:
(b.3) one or more of said rare earth elements are bound by a binding agent or a solubility enhancing complex to the semiconducting host material of the REDS layer.

16. The optical signal processing device of claim 15 wherein:
(b.3a) said binding agent is included and the binding agent comprises at least one of oxygen, nitrogen, and sulfur.

17. The optical signal processing device of claim 15 wherein:
(b.3a) said binding agent is included and the binding agent defines a chemical binding complex between at least one of the rare earth elements and the semiconducting host material so as to chemically bind the at least one rare earth element to the semiconducting host material of the REDS layer.

18. The optical signal processing device of claim 17 wherein:
(b.3b) said chemical binding complex comprises an Er—O—Si complex.

19. The optical processing device of claim 14 wherein:
(b.3) one or more of said rare earth elements are trapped within the REDS layer by one or more amorphous trapping layers formed in or adjacent to the REDS layer.

20. The optical processing device of claim 14 wherein:
(b.2a) said pumping energy includes said electrical pump energy.

21. The optical processing device of claim 14 wherein:
(b.1a) at least a first optical signal port of one of said optical signal amplifying and/or reconditioning structures is adapted for receiving a respective first C-band optical input signal, said C-band being centered at about a 1.5 µm wavelength.

22. The optical processing device of claim 14 wherein said received pumping energy of at least one respective pump energy receiving region includes optical pump energy and wherein:
(b.2a) said at least one respective pump energy receiving region is adapted for receiving optical pumping energy in the form of at least Raman type pumping energy having an effective frequency which is about one optical phonon frequency higher than a signal frequency of at least a first optical signal received by said at least a first optical signal port of a respective one of said optical signal amplifying and/or reconditioning structures.

23. The optical processing device of claim 22 wherein:
(b.3) said one or more respective optical signal amplifying and/or reconditioning structures comprise at least one member of the group consisting of waveguides (WG's), Arrayed WaveGuides (AWG's), gratings, phase shift modulators, and optically, electrically and/or mechanically controlled spatial multiplexers and/or demultiplexers.

24. The optical processing device of claim 14 wherein:
(b.3) said one or more respective optical signal amplifying and/or reconditioning structures comprise at least one member of the group consisting of waveguides (WG's), Arrayed WaveGuides (AWG's), optical switches, gratings, phase shift modulators, and optically, electrically and/or mechanically controlled spatial multiplexers and/or demultiplexers.

25. The optical processing device of claim 14 wherein:
(b.3) said one or more respective optical signal amplifying and/or reconditioning structures are adapted for amplifying and/or reconditioning signals in a wavelength band centered at about 1.3 µm.

26. The optical processing device of claim 14 and further comprising:
(c) one or more optical pump energy reflecting means, operatively coupled to said one or more respective optical signal amplifying and/or reconditioning structures, said optical pump energy reflecting means being arranged to bounce one or more pumping beams back and forth in non-parallel fashion through rare earth element containing portions of the amplifying and/or reconditioning structures that carry optical signals, the non-parallel fashion being nonparallel to a major traveling direction of the carried optical signals.

27. The optical processing device of claim 26 wherein:
(c.1) said one or more optical pump energy reflecting means includes means for bouncing the one or more pumping beams multi-dimensionally in non-parallel fashion through the rare earth element containing portions so that bouncing is not restricted to occurring just laterally or just approximately vertically relative to a major plane of the REDS layer, but is instead directed to occur in plural, three-dimensionally different directions relative to said major plane of the REDS layer.

28. The optical processing device of claim 14 wherein:
(a.1) said substrate includes a first dielectric layer monolithically integrated therewith and having a respective first refractive index that is substantially lower than a second refractive index attributed to the REDS layer, and where the REDS layer is disposed immediately adjacent to the first dielectric layer so that the first dielectric layer can function as a confinement layer for optical beams traveling through the REDS layer.

29. The optical processing device of claim 14 wherein:
(b.3) said one or more rare earth elements are distributed in the semiconducting host material according to a predefined discrete concentration graduation profile.

30. The optical processing device of claim 14 and further comprising:
(c) a monolithically integrated electronics region integrally formed in or adjacent to the REDS layer for providing electronic functions including electro-optical transduction.

31. The optical processing device of claim 30 wherein:
(c.1) said monolithically integrated electronics region includes a pump energy modulator for modulating intensity of said electrical pump energy so as to thereby encode an intensity modulated signal on an optical carrier signal traveling through the REDS layer.

32. The integrated device of claim 1 wherein:
the patterned REDS layer includes electrical conductivity-providing dopants.

33. The integrated device of claim 1 wherein:
the patterned REDS layer includes an amorphous silicon layer disposed above an N-doped or P-doped silicon layer.

34. The integrated device of claim 1 wherein:
a portion of the patterned REDS layer includes a rare-earth enriched layer having a higher concentration of rare earth elements than adjoining layers within the REDS layer, where the rare-earth enriched layer is disposed at a predetermined depth within the patterned REDS layer that aligns approximately with a peak intensity core concentration region of a guided optical signal that is to guided through that portion of the patterned REDS layer.

35. The integrated device of claim 34 wherein:
the patterned REDS layer adjoins semiconductor regions that define electronic circuits and are not contaminated by the rare-earth elements of the patterned REDS layer.

36. The integrated device of claim 1 wherein:
the patterned REDS layer includes a portion shaped as an optical rib waveguide structure.

37. The integrated device of claim 1 wherein:
the patterned REDS layer includes a portion shaped as an optical ridge waveguide structure.

38. The integrated device of claim 1 wherein:
the patterned REDS layer includes a portion shaped as two optical rib waveguide structures disposed adjacent to one another such that predetermined respective optical signals respectively guided by the two optical rib waveguide structures overlap with one another within the REDS layer so as to provide signal amplification and/or cross-modulation by virtue of said overlap.

* * * * *